United States Patent [19]

Polster

[11] Patent Number: 5,494,687

[45] Date of Patent: Feb. 27, 1996

[54] PROCESS FOR TENDERIZING MEAT

[76] Inventor: Louis S. Polster, 2205 Marthas Rd., Alexandria, Va. 22307

[21] Appl. No.: 148,915

[22] Filed: Nov. 5, 1993

[51] Int. Cl.$^6$ .............................. A23B 4/005; A23L 1/31; A23L 3/10; B65B 55/22

[52] U.S. Cl. .......................... 426/55; 426/412; 426/418; 426/438; 426/520

[58] Field of Search .............................. 426/55, 412, 418, 426/438, 520

[56] References Cited

U.S. PATENT DOCUMENTS

| | | |
|---|---|---|
| 2,565,311 | 8/1951 | Koonz et al. . |
| 2,713,002 | 7/1955 | Williams . |
| 3,262,787 | 7/1966 | Ellis ........................................ 426/281 |
| 3,445,240 | 5/1969 | Bedrosian et al. . |
| 3,552,297 | 1/1971 | Williams . |
| 3,663,233 | 5/1972 | Keszler ................................... 426/281 |
| 3,949,114 | 4/1976 | Viola et al. . |
| 3,961,086 | 6/1976 | Turbak . |
| 3,961,090 | 6/1976 | Weiner et al. ......................... 426/281 |
| 3,966,980 | 6/1976 | McGuckian . |
| 3,983,258 | 9/1976 | Weaver . |
| 3,988,499 | 10/1976 | Reynolds . |
| 4,132,048 | 1/1979 | Day . |
| 4,136,205 | 1/1979 | Quattlebaum . |
| 4,233,323 | 11/1980 | Sway et al. . |
| 4,346,650 | 8/1982 | Zaitsu . |
| 4,534,984 | 8/1985 | Kuehne . |
| 4,983,411 | 1/1991 | Tanaka et al. . |

FOREIGN PATENT DOCUMENTS

| | | | |
|---|---|---|---|
| 668554 | 8/1963 | Canada ..................................... | 426/55 |

OTHER PUBLICATIONS

R. A. Lawrie, Meat Science, 2d Ed., Pergamon Press New York, 1974, pp. 224 and 225.

The Meat Handbook, Albert Levie, AVI Publishing Co., Inc., Westport Conn., 1963, pp. 44 and 45.

*Primary Examiner*—Donald E. Czaja
*Assistant Examiner*—Curtis E. Sherrer
*Attorney, Agent, or Firm*—Oliff & Berridge

[57] ABSTRACT

Meat is tenderized in the absence of a tenderizing agent by immersing the meat in a liquid bath and maintaining the bath at a controlled temperature within a range that hastens enzymatic tenderizing of the meat.

24 Claims, No Drawings

PROCESS FOR TENDERIZING MEAT

BACKGROUND OF THE INVENTION

This invention relates to a process for tenderizing meat to prepare it for cooking.

Aging of meat can be carried out by storing pieces of the meat in a refrigerated space for a time sufficient to permit natural enzymes to complete a tenderizing process. Enzymes in the meat continue to function postmortem to catalyze the hydrolysis of collagen and other proteins. The enzymes break down connective tissue so that the meat becomes tender and flavorful. After aging, the texture of the meat is more acceptable to the consuming public.

During aging, the meat is generally refrigerated at a temperature of about 34° F. to suppress bacterial growth and at a relative humidity of about 80% to suppress mold growth. However at these conditions, the rate of enzymatic action is suppressed. An average of twenty-one days or more is often required to obtain satisfactory tenderizing. Substantial space in a refrigeration facility is required to store the meat for this period of time.

Increasing the temperature used in the aging process accelerates activity of the enzymes for tenderizing meat. However, bacterial activity is also increased. Slime growth, putrefaction and mold growth result in spoilage and can cause a substantial loss of usable meat. Maintaining low humidity in the refrigerated space to retard mold growth tends to desiccate and discolor meat. The desiccated and discolored parts must be trimmed. Additionally, low humidity causes shrinkage.

U.S. Pat. No. 2,713,002 to Williams proposes aging meat by storing a carcass in the presence of ultraviolet radiation. The carcass is wrapped in a combination of absorbent material with a moisture-vapor-permeable, pliable, extensile film. The meat is wrapped in the film and held under ultraviolet radiation for five, ten, fifteen or twenty days at between 30° F. to 40° F.; for five or ten day periods at 47° F.; for two, three or five days at 60° F.; or for one or two days at 70° F. The covered meat is initially chilled in a cooler at a temperature of about 30° to 45° F. A period of twenty-four to seventy-two hours is required to bring the meat to an initial chill temperature for aging of about 30° F. to 35° F.

U.S. Pat. No. 3,445,240 to Bedrosian et al. discloses tenderizing meat by storage under specific controlled chilled conditions and for definite periods of time in an atmosphere containing controlled amounts of oxygen and carbon dioxide at a high humidity.

U.S. Pat. No. 3,552,297 to Williams relates to an apparatus for aging and flavoring meat at a temperature of around 65° F. to 75° F. The apparatus includes a germicidal lamp and a timer motor for setting the aging process for a period of one to four days. The aging process is conducted in the presence of Thamnidium, an anti-bacteria agent.

U.S. Pat. No. 3,663,233 to Keszler teaches a process of tenderizing and cooking meat products by pumping the beef with a liquid tenderizing agent. The beef is heated to a constant temperature and maintained at such temperature to allow tenderizing by the tenderizing agent. The temperature is then raised to cook the meat.

U.S. Pat. No. 3,961,090 to Weiner et al. teaches pumping an aqueous solution into a piece of uncooked beef, vacuum sealing the beef in a bag and cooking the beef "to attain a maximum internal temperature of 131° to 140° F."

U.S. Pat. No. 3,966,980 to McGuckian discloses a method of cooking foods in vacuum packages in a thermostatically controlled hot water bath followed by quick chilling and storage at 28° F. to 32° F. The bath is maintained in a range between 140° F. to 212° F. to cook the meat at least to a "rare" state. The cooked food is thereafter quick chilled for storage. A disclosed advantage of the process is that the meat may be enzymatically tenderized while it is being cooked.

U.S. Pat. No. 4,233,323 to Sway et al. discloses a tenderization process of exposing meat to ultraviolet rays of high intensity.

U.S. Pat. No. 4,346,650 to Zaitsu discloses a bath for sterilizing and cooking food. The process is a two-step process requiring sterilization at about 105° C. (221° F.) to about 140° C. (284° F). The bath sterilizes and cooks packaged foods.

U.S. Pat. No. 4,983,411 to Tanaka et al. relates to an apparatus used for ultraviolet sterilization and shrink film packaging food. In the packaging step, the food is sprinkled with hot water.

A process of quick aging meat by exposure to an elevated temperature is desired. However, elevated temperatures for periods required to quick age meat can cause the meat to decompose by cooking, and even normal thermostatic controls can cause non-uniform tenderization and cooking. Elevated temperatures at shorter periods of time can stimulate bacteria growth causing spoilage, and measures such as ultraviolet irradiation and chemical treatment to combat spoilage can be undesirable and expensive.

SUMMARY OF THE INVENTION

The present invention relates to a process of uniformly tenderizing meat in the absence of an applied tenderizing agent to prepare it for cooking, comprising immersing the meat in a liquid bath and maintaining the entire volume of the bath at a controlled temperature for a sufficient time to carry out enzymatic tenderization of the meat.

DETAILED DESCRIPTION OF PREFERRED EMBODIMENTS

The process of the invention permits aging (tenderizing) of meat within an abbreviated period of time in the absence of a chemical tenderizing agent and preferably also in the absence of an anti-bacteria agent. The process comprises immersing the meat in a liquid bath such as a water bath. The entire volume of the bath is maintained at a controlled temperature within a range that hastens the enzymatic tenderizing of the meat. The temperature is preferably below a minimum cooked temperature of the meat, preferably at a temperature that kills bacteria in at least the initial stages of the process. The meat is held at the bath temperature during tenderization. The process of this invention permits the tenderized meat to be chilled, stored, and/or distributed and later cooked for serving.

Cooking uses heat to substantially decompose and change fibers of meat. Cooking adds texture and flavor and prepares the meat for human consumption. The term minimum cooked temperature for a meat as used herein is a minimum temperature that a meat attains in preparation of the meat for human consumption as cooked meat.

The process of the invention can be applied to the aging of different types of meat, for example, beef, veal, pork, mutton, lamb or poultry, most preferably beef. Cooked temperatures for various meats are known. Typical minimum cooked temperatures for typical meats are as follows: rare beef—140° F.; veal—175° F.; lamb—160° F.; pork 175° F.; poultry 160° F. Thus suitable temperatures below the minimum cooked temperature of the meat for use in the present invention include temperatures less than or equal to 133° F., such as 130° F. or 125° F. for beef. For other meats, the tenderizing temperature is kept under 160° F., preferably under 150° F., to avoid inactivation of enzymes.

Various sizes of meat can be tenderized by the process of the present invention. For example, very large sizes such as carcasses, primal cuts and whole muscle meat as well as various smaller sizes of meats can be tenderized by the process of the invention. Suitable periods of time for conducting the process of the invention to obtain tenderizing of meat will vary with the type of the meat once the meat has reached a uniform temperature. In general, the meat should be maintained in the bath long enough to reach a uniform temperature throughout its thickness, and long enough thereafter to reach the desired degree of tenderness. To expedite transfer of the bath temperature throughout larger cuts of meat, one can insert one or more heat conductors, for example aluminum spike(s), in the meat, taking care that they are inserted in a manner that will not cause perforation of any envelope around the meat.

According to a process of the invention, the entire volume of the bath is maintained at a controlled temperature within a range that hastens enzymatic tenderizing of the particular meat below a minimum cooked temperature of the meat. Thus in this preferred embodiment, the bath does not include even localized areas of liquid at or above the minimum cooked temperature. In embodiments, the process comprises immersing or spraying the meat in or with liquid or a liquid vapor such as steam at a first temperature within a range that quickly kills surface bacteria without substantially cooking the surface of the meat. The meat is then maintained in a liquid bath at a second temperature lower than the first temperature within a range that hastens enzymatic tenderizing of the meat.

According to a preferred process of the present invention, the entire volume of the bath is maintained at a controlled temperature within a range of ±2° F. to maximize uniform quality of the tenderized meat procut.

The meat is preferably enveloped in a relatively non-insulating material that is substantially impermeable to the liquid of the bath. The material should be impermeable to prevent the meat from being permeated by the bath liquid. Additionally, the material must be relatively non-insulating to permit transfer of heat from the bath to the meat. Suitable materials are known to those of ordinary skill in the art, and can include materials such as those used in many cooking bags and wraps. Appropriate materials for enveloping the meat include polymeric laminates that can be comprised of an oxygen barrier layer and a moisture barrier layer. The oxygen barrier layer may comprise a hydrolyzed olefin/vinyl ester copolymer. The oxygen barrier layer may be a heat-sealable layer comprising high density polyethylene, alone or mixed with polyisobutylene; polypropylene; ethylene-propylene copolymers; ionomeric resins; polybutene-1 or blends of such polymers.

The laminate may include a substrate layer comprising a polyamide, which may be a homopolyamide such as polycaprolactam or polyhexamethyleneadipamide or a copolyamide; a polyester such as polyalkylene terephthalate or isophthalate; a polycarbonate; polypropylene; a polyallomer; poly(4-methyl-pentene-1); polybutene-1; polystyrene; polyvinyl chloride; medium or high density polyethylene; an acrylonitrile-butadiene-styrene resin; a methacryonitrile-butadiene-styrene resin or a blend of two or more such polymers. Examples of suitable materials are disclosed in U.S. Pat. Nos. 3,949,114 to Viola et al., 3,961,086 to Turbak, 3,983,258 to Weaver, 3,988,499 to Reynolds, 4,132,048 to Day, 4,136,205 to Quattlebaum and 4,534,984 to Kuehne. The entire disclosures of these patents are incorporated herein by reference.

A preferred process according to the present invention comprises encasing the meat in a plastic pouch, evacuating air from the pouch and sealing the pouch under high vacuum. According to a preferred embodiment, the process of tenderizing meat in the absence of a tenderizing agent (or anti-bacteria agent), comprises vacuum packaging meat in a pouch, immersing the meat in a liquid bath, and maintaining the bath at a controlled temperature within a range below a minimum cooked temperature of the meat that hastens enzymatic tenderizing in the meat.

Any suitable thermal conveying liquid may be used as the bath liquid in the process of the invention. For example, the bath can comprise water or cooking oil. Preferably, the liquid is water.

The process preferably comprises immersing the meat in the bath and maintaining the bath within a very closely controlled temperature range, for example by heating laterally adjacent zones of the fluid and vertically perturbating the fluid, such as with a liquid jet or with bubbles. A suitable thermalizing apparatus for tenderizing meat according to the present invention including maintaining the bath temperature by heating laterally adjacent zones of fluid and vertically perturbating the fluid with bubbles is disclosed in U.S. patent application Ser. No. 08/065,627 to Polster entitled "Rethermalizer." The entire disclosure of this patent application is incorporated herein by reference.

Precise temperature control is critical to high quality results in cooking and rethermalizing vacuum packaged foods. Precise temperature control is also important to the process of tenderizing meat according to the present invention.

Heating in water or other liquid baths can result in localized too high or too low temperatures, throughout the bath or in localized zones, that impair food quality. A liquid bath does not flow evenly over all surfaces, but rather takes a path of least resistance. A liquid bath tends to stratify into thermal layers of different temperatures. Even if heat is applied throughout the surface of a vessel, the heat separates into laterally adjacent zones within the liquid, each zone having a width of a few inches or so. These conditions can prevent accurate temperature control in a hot liquid bath. Inaccurate temperature control and/or variable heat transfer rates within a bath can prevent satisfactory tenderizing of meat. Localized hot spots can cause some portions of the meat to cook. Low temperature zones can prevent or reduce tenderizing and even permit bacteria growth.

The present invention includes both batch and continuous tenderizing processes. Temperature control in a liquid is more difficult in a continuous tenderizing process. Liquid is lost from the bath not only by evaporation, but additionally by significant liquid transfer with product as tenderized meat is removed. Liquid would be required to be added to the heated bath usually in a significant quantity by the time bath level decline is observed by a food worker. Addition of liquid can cause temperature change in the bath whether heated or cooled liquid is added. This effect, if not controlled, can adversely influence the tenderizing process by causing temperature variation over time and localization of temperature zones. Control can be accomplished, however, as discussed below.

Another problem with heating in a liquid bath relates to temperature control techniques. The thermodynamics of a liquid bath create a lag time between the application of heat energy and the sensing of the same by a control system and the establishing of a uniform temperature throughout a bath in response to the setting. The thermodynamics of the liquid and the lag time may result in "overshoot" of temperature.

Liquid circulation can help to prevent temperature layer stratification and overshoot. However, circulation according to conventional bath heating methods is insufficient to provide the control necessary for tenderizing meat. Additionally, circulation alone does not assure even flow over all surfaces of meat. The meat itself may disturb the circulation pattern of a bath. The bath liquid will take a path of least resistance and may create localized temperature zones or layer stratification.

Typical thermostatically controlled liquid baths used for cooking exhibit problems of heating and temperature control as described above. Thermostatically controlled liquid baths are characterized by overshoot and localized hot or cold spots. Most thermostatically controlled liquid baths cannot be used in the process of the present invention to maintain the entire volume of the liquid bath at a controlled temperature within a range of ±2° F.

The rethermalizer of Polster is provided with tubes to generate liquid flow. The tubes can inject bubbles, for example air bubbles, or liquid jets at various locations in the vessel to cause scrubbing of surfaces of meat. The resulting action provides excellent heat exchange at meat surfaces and eliminates temperature zoning and stratification. The vessel permits an accurate and efficient heat transfer to the meat to permit a uniform temperature within the meat without hot or cold spots. The bubbles or jets cause a vertical perturbation that permits utilizing the bath for a process of tenderizing meat without decomposition by cooking and without undesirable bacteria growth.

The Polster rethermalizer includes specially arranged and cooperative temperature sensors. The sensors are vertically displaced to provide a temperature sensing and responsive water level control system. Temperature differentials are sensed between different vertical locations within the bath, permitting the addition of water in small regular quantities as needed. Additionally, the rethermalizer vessel is heated in laterally adjacent zones. A temperature sensor is located on the vessel for each zone near the heater to cooperate with sensors near the vessel bottom. The arrangement compensates for lag time, i.e., thermal momentum, and prevents overshoot of temperature above optimum tenderizing temperatures.

Adding bath liquid at different temperatures within the liquid bath is another technique that can be used to maintain the liquid bath at a controlled temperature according to the invention.

The process of the invention is particularly advantageous for tenderizing meat either in advance of delivery to a serving area or at the serving area immediately prior to cooking. For example, individual steaks can be tenderized in a restaurant by the process. Additionally, the process of immersing a meat in a liquid bath can be conducted at higher temperatures to cook meat. Thereafter, the meat can be subjected to an elevated temperature for a brief time outside the immersing vessel to provide a characteristically grilled appearance or the like.

While the invention has been described in connection with specific embodiments, it is to be understood that the embodiments are by way of illustration and are not intended to limit the invention. For example, while the invention is described in connection with the rethermalizer vessel disclosed by Polster in U.S. patent application Ser. No. 08/065,627, various sizes of meat may require different size vessels or different types of vessels. An enlarged vessel can be utilized to conduct the process of the invention with larger cuts of meat or an adapted Polster vessel with a separate heat source for tight control of temperature within the required range and/or an outside source of controlled temperature bath liquid can be utilized. While the invention is described in connection with the rethermalizer vessel disclosed by Polster and while the invention can be carried out in thermalizer vessels of varying size or Polster thermalizing vessels that may be modified, the process of the invention can be conducted by any suitable apparatus.

What is claimed is:

1. A process of tenderizing meat in the absence of an applied tenderizing agent, comprising immersing the meat in a liquid bath and maintaining the entire volume of the bath at a controlled temperature below a minimum cooked temperature of the meat for a sufficient time to carry out enzymatic tenderization of the meat.

2. The process of claim 1, further comprising initially subjecting said meat to a first temperature above a minimum cooked temperature of the meat for a time sufficient to kill surface bacteria without substantial cooking of the surface of the meat.

3. The process of claim 1, comprising maintaining the entire volume of said bath at a controlled temperature within a range of ±2° F.

4. The process of claim 1, wherein said meat is beef and said controlled temperature is maintained to be less than 135° F. and within a range of ±2° F.

5. The process of claim 1, wherein said meat is selected from the group consisting of veal, lamb, pork and poultry and said controlled temperature is maintained to be less than 160° F. and within a range of ±2° F.

6. The process of claim 1, comprising enveloping said meat in a relatively non-insulating material that is substantially impermeable to the liquid of said bath before immersing the meat in the bath.

7. The process of claim 1, comprising encasing the meat in a plastic pouch, evacuating air from the pouch and sealing the pouch before immersing the meat in the bath.

8. The process of claim 1, wherein said liquid comprises a liquid selected from water and cooking oil.

9. The process of claim 1, wherein said liquid comprises water.

10. The process of claim 1, comprising separately heating laterally adjacent zones of said bath and vertically perturbating said bath to maintain said bath at said controlled temperature.

11. The process of claim 10, wherein said bath is vertically perturbated with bubbles.

12. The process of claim 1, comprising adding liquid to said bath without thereby causing greater than 2° F. variations within the entire volume of said bath.

13. The process of claim 1, comprising maintaining said bath at said temperature within a vessel having a plurality of spaced apart temperature sensors.

14. The process of claim 1, wherein at least one heat conductive member is inserted into said meat before immersing the meat in the liquid bath.

15. A process of tenderizing meat in the absence of an applied tenderizing agent, comprising immersing the meat in a liquid bath and separately heating laterally adjacent zones of said bath to maintain the entire volume of said bath at a controlled temperature.

16. The process of claim 15, further comprising vertically perturbating said bath to disrupt temperature stratification.

17. The process of claim 15, comprising adding liquid to said bath without thereby causing greater than 2° F. variations within the entire volume of the bath.

18. The process of claim 15, wherein said controlled temperature is maintained within a range of ±2° F.

19. The process of claim 15, comprising maintaining said bath at said temperature within a vessel having a plurality of spaced apart temperature sensors.

20. A process of tenderizing meat in the absence of an applied tenderizing agent, comprising initially subjecting the meat to a first temperature above a minimum cooked temperature of the meat for a time sufficient to kill surface bacteria without substantial cooking of the surface of the meat, and immersing the meat in a liquid bath and maintaining the bath at a second temperature lower than said first temperature for a time sufficient to carry out enzymatic tenderizing of the meat.

21. The process of claim 20, comprising vertically perturbating said bath.

22. The process of claim 20, comprising adding liquid to said bath without thereby causing greater than 2° F. variations within the entire volume of the bath.

23. The process of claim 20, wherein said second temperature is controlled within a range of ±2° F. by a method comprising separately heating laterally adjacent zones of said bath and vertically perturbating said bath.

24. The process of claim 23, comprising maintaining said bath at said temperature within a vessel having a plurality of spaced apart temperature sensors.

* * * * *